US012374306B1

(12) United States Patent
Azizi et al.

(10) Patent No.: US 12,374,306 B1
(45) Date of Patent: Jul. 29, 2025

(54) DISPLAY COLUMN DRIVER DEVICES WITH OFFSET CANCELLATION

(71) Applicant: Apple Inc., Cupertino, CA (US)

(72) Inventors: Yaser Azizi, Santa Clara, CA (US); Shatam Agarwal, San Jose, CA (US); Fenghua Zheng, Saratoga, CA (US); David S Zalatimo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 349 days.

(21) Appl. No.: 18/315,380

(22) Filed: May 10, 2023

Related U.S. Application Data

(60) Provisional application No. 63/354,522, filed on Jun. 22, 2022.

(51) Int. Cl.
*G09G 3/36* (2006.01)

(52) U.S. Cl.
CPC ... *G09G 3/3648* (2013.01); *G09G 2320/0276* (2013.01); *G09G 2320/0673* (2013.01)

(58) Field of Classification Search
None
See application file for complete search history.

(56) References Cited

U.S. PATENT DOCUMENTS 5,483,256 A 1/1996 Ohi
8,237,808 B2 8/2012 Matsumoto et al.
9,530,368 B2 12/2016 Lee et al.
9,721,502 B2 8/2017 Bi et al.
10,115,357 B2 10/2018 Kim et al.
10,504,405 B2 12/2019 Bae et al.
10,891,904 B2 * 1/2021 Jeon .................... G09G 3/3275
11,099,804 B2 8/2021 Zheng et al.
11,107,434 B2 8/2021 Kim et al.
2007/0080905 A1 4/2007 Takahara
2008/0303767 A1 12/2008 Ludden et al.
2012/0293476 A1 * 11/2012 Lee .................... G09G 3/3614 345/209
2015/0145898 A1 * 5/2015 Hwang ................ G09G 3/3614 345/96
2018/0075798 A1 3/2018 Nho et al.
2022/0093025 A1 * 3/2022 Kim .................... G09G 3/3696

FOREIGN PATENT DOCUMENTS

KR 20120124368 A 11/2012

* cited by examiner

*Primary Examiner* — Krishna P Neupane
(74) *Attorney, Agent, or Firm* — Treyz Law Group; Jason Tsai

(57) ABSTRACT

An electronic device may include a display having an array of pixels that receive data signals from multiple column driver integrated circuits. Each column driver integrated circuit may include gamma amplifiers that are used to set gamma references for driving the data signals. Each gamma reference can be set using first and second (redundant) gamma amplifiers in an alternating fashion to perform auto-zeroing. The auto-zeroing operation can be combined with a chopping operation to minimize amplifier offset across the different column driver integrated circuits. The auto-zeroing and/or the chopping function can be spatially alternated across the different rows in the array and temporally alternated across the different display frames.

20 Claims, 9 Drawing Sheets

DISPLAY COLUMN DRIVER DEVICES WITH OFFSET CANCELLATION

This application claims the benefit of U.S. Provisional Patent Application No. 63/354,522, filed Jun. 22, 2022, which is hereby incorporated by reference herein in its entirety.

FIELD

This disclosure relates generally to electronic devices and, more particularly, to electronic devices with displays.

BACKGROUND

Electronic devices often include displays. For example, an electronic device may have an organic light-emitting diode (OLED) display based on organic light-emitting diode pixels. In this type of display, each pixel includes a light-emitting diode and thin-film transistors for controlling application of a signal to the light-emitting diode to produce light.

A display can sometimes include multiple column driver integrated circuit chips for driving data signals to an array of pixels on a separate display panel. Each column driver integrated circuit chip typically includes gamma amplifiers for generating reference voltages that are used to drive the data signals. It can be challenging to design the gamma amplifiers. If care is not taken, any offset associated with the gamma amplifiers and any process variation from one column driver integrated circuit chip to another can result in noticeably artifacts on the display.

SUMMARY

An electronic device having a display is provided. The display may include a display panel having an array of pixels, a timing controller to manage the timing of digital display data received from a host such as an image or video source, and a plurality of column driver integrated circuits coupled between the timing controller and the array of pixels. Each of the column driver integrated circuits may include column drivers for outputting data signals to the array of pixels, decoders for receiving the digital display data from the timing controller and for outputting analog voltages to the column drivers, and gamma amplifiers configured to set gamma references for the decoders. A hybrid auto-zeroing and chopping scheme may be applied to the gamma amplifiers to help cancel out offset voltages associated with the gamma amplifiers.

The auto-zeroing scheme may involve using first and second redundant gamma amplifiers to drive a given gamma reference, which can be shared among hundreds or thousands of column drivers in generating data signals for each column of pixels in the display panel. The first and second gamma amplifiers may alternate between an offset-hold phase and an offset-sampling phase from one row to another. The auto-zeroing scheme may be combined with an amplifier chopping scheme, where the polarity of each gamma amplifier may change spatially across the rows during any given frame and may change temporally across multiple frames. The same gamma amplifier should always be used for any given row in the array. In other words, if the first gamma amplifier is being used to drive data signals for a first row of pixels in one frame, then the first gamma amplifier should also be used to drive data signals for the first row in all subsequent frames.

The auto-zeroing (AZ) operation involves alternating between the first and second gamma amplifier. As an example, the AZ operation can alternate (spatially) every row where the first gamma amplifier is used to set the gamma reference for driving data signals to the odd rows while the second gamma amplifier is used to set the gamma reference for driving data signals to the even rows. As another example, the AZ operation can change every two rows where the first gamma amplifier is used to set the gamma reference for driving data signals to the first and second rows while the second gamma amplifier is used to set the gamma reference for driving data signals to the third and fourth rows. As yet another example, the AZ operation can change every three rows where the first gamma amplifier is used to set the gamma reference for driving data signals to the first, second, and third rows while the second gamma amplifier is used to set the gamma reference for driving data signals to the fourth, fifth, and sixth rows.

The combined chopping operation can involve changing the polarity of the gamma amplifiers across the different rows (for spatial interleaving). As an example, the chopping polarity can switch every row where a positive amplifier polarity is used to drive data signals for the odd rows while the negative amplifier polarity is used to drive data signals for the even rows. As another example, the chopping polarity can switch every two rows where the positive amplifier polarity is used to drive data signals for the first and second rows while the negative amplifier polarity is used to drive data signals for the third and fourth rows. As yet another example, the chopping polarity can switch every three rows where the positive amplifier polarity is used to drive data signals for the first, second, and third rows while the negative amplifier polarity is used to drive data signals for the fourth, fifth, and sixth rows.

The combined chopping operation can also involve changing the polarity of the gamma amplifiers across the different frames (for temporal averaging). As an example, the chopping polarity can switch every frame where a positive amplifier polarity is used to drive the gamma reference for data signals for a particular set of rows in the first frame and a negative amplifier polarity is used to drive the gamma reference for data signals for the same set of rows in the second (consecutive) frame immediately following the first frame. As another example, the chopping polarity can switch every two frames where a positive amplifier polarity is used to drive the gamma reference for data signals for a particular set of rows in the first and second consecutive frames and a negative amplifier polarity is used to drive the gamma reference for data signals for the same set of rows in the third and fourth consecutive frame immediately following the second frame. As yet another example, the chopping polarity can switch every three frames where a positive amplifier polarity is used to drive the gamma reference for data signals for a particular set of rows in the first, second, and third consecutive frames and a negative amplifier polarity is used to drive the gamma reference for data signals for the same set of rows in the fourth, fifth, and sixth consecutive frame immediately following the third frame.

DETAILED DESCRIPTION

Figure 1:
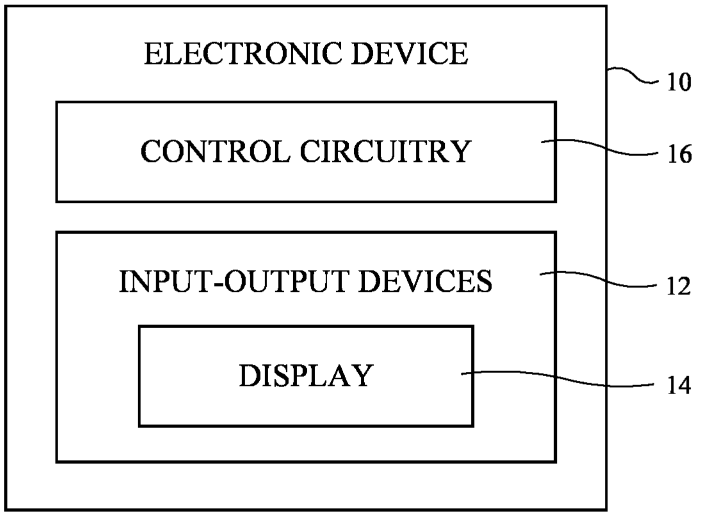
FIG. 1 is a schematic diagram of an illustrative electronic device having a display in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include control circuitry 16 for supporting the operation of device 10. Control circuitry 16 may include storage such as hard disk drive storage, nonvolatile memory (e.g., flash memory or other electrically-programmable-read-only memory configured to form a solid-state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input resources of input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the display pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Display 14 may include one or more display devices such as organic light-emitting diode display panels (panels with organic light-emitting diode pixels formed on polymer substrates or silicon substrates that contain pixel control circuitry), liquid crystal display panels, electrophoretic display panels, microelectromechanical systems displays (e.g., two-dimensional mirror arrays or scanning mirror display devices), display panels having pixel arrays formed from crystalline semiconductor light-emitting diode dies (sometimes referred to as microLEDs), or may be a display based on other types of display technology. Device configurations in which display 14 is an organic light-emitting diode display are sometimes described herein as an example. This is, however, merely illustrative. Any suitable type of display may be used, if desired. In general, display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
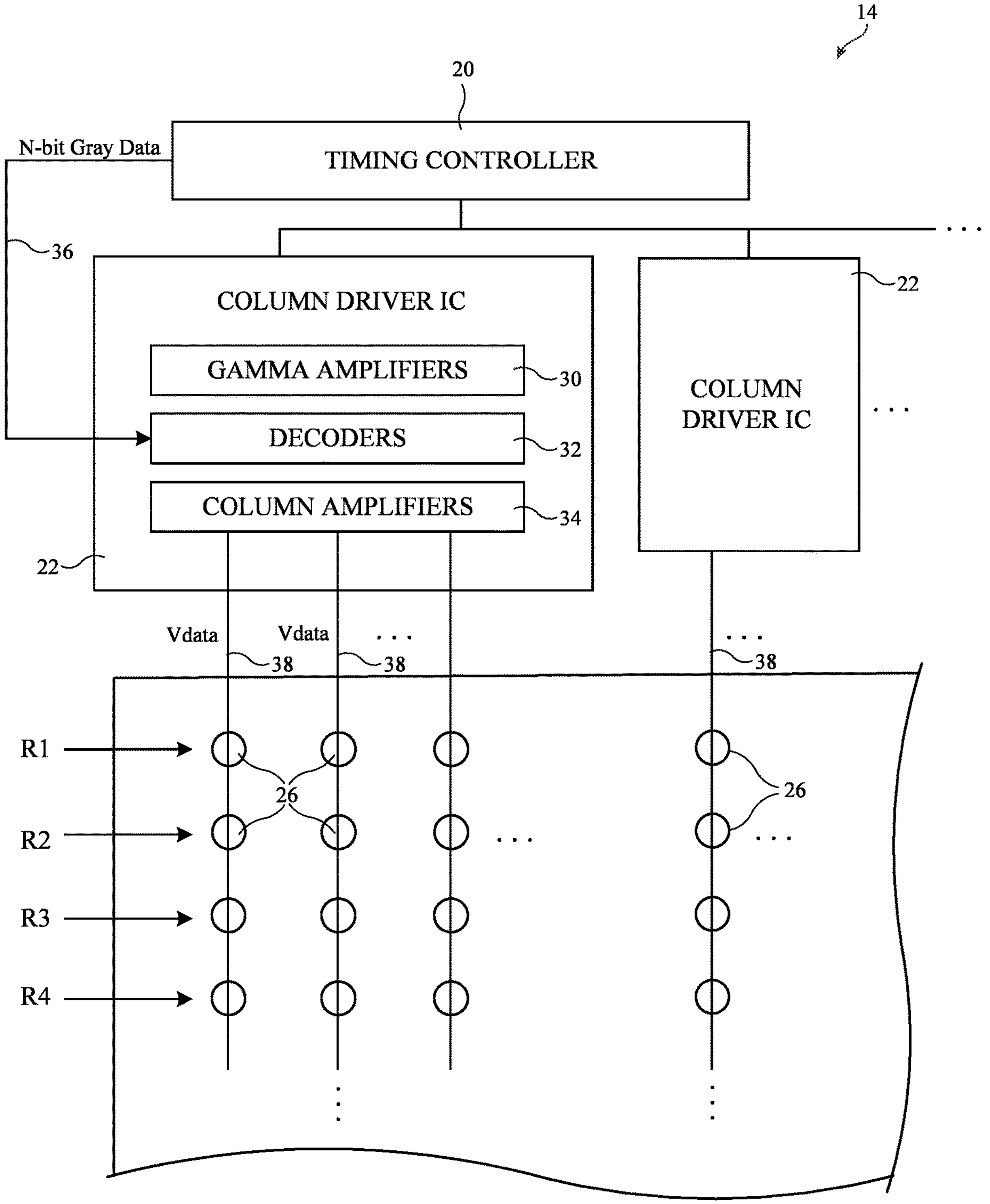
FIG. 2 is a schematic diagram of an illustrative display with multiple column driver integrated circuit (CDIC) devices each having gamma amplifiers in accordance with some embodiments.

FIG. 2 is a schematic diagram of display 14 having multiple column driver integrated circuit (CDIC) devices. As shown in FIG. 2, display 14 may include a timing controller 20, multiple column driver integrated circuits (devices or chips) 22, and a separate display panel 24 having an array of display pixels 26. Display panel 24 may include an array of pixels 26 formed on a display substrate. Display pixels 26 may be any type of display pixels (e.g., organic light-emitting diode pixels, liquid crystal display pixels, electrophoretic display pixels, microLEDs, etc.). The display pixels 26 may be arranged in rows and columns to form an array of pixels. FIG. 2 illustrates a first row (line) of pixels R1, a second row (line) of pixels R2, a third row (line) of pixels R3, and a fourth row (line) of pixels R4. In general, display panel 24 may include hundreds or thousands of rows (or lines) of pixels 26.

Timing controller 20 may display data on display pixels 26 by providing digital data to the column driver integrated circuits 22 via data path 36. For example, timing controller 20 may provide N-bit gray data to decoding circuits such as decoders 32 within each column driver integrated circuit 32. Decoders 32 may then convert the digital N-bit gray data into corresponding analog voltage signals. The analog voltage signals output from decoders 32 may be subsequently driven onto respective column lines 38 as analog data voltage signals Vdata using column driving circuits such as column drivers 34. Each column driver device 22 may include tens, hundreds, or thousands of parallel column driver circuits 34 configured to drive different data signals Vdata onto column lines 38. Each column driver circuit 34 may include a column driver amplifier (as an example). Column lines 38 carrying data signals Vdata are therefore sometimes referred to as data lines. Each column line 38 may be coupled to hundreds or thousands of pixels 26 in that column.

The relationship between the value of the digital data supplied by timing controller 20 and the resulting luminance of the display pixels 26 (i.e., the final magnitude of analog data signals Vdata) is defined by a function that is sometimes referred to as a gamma curve. The gamma curve may be implemented using a series of resistive ladders that define the shape of the gamma curve. Each resistive ladder may receive a reference voltage sometimes referred to as a gamma reference voltage. Column driver device 22 may further include amplifying circuits such as gamma amplifiers 30 configured to set the gamma reference voltages that are used to drive the data signals to the corresponding rows. The output of each gamma amplifier 30 may be referred to as a gamma tap point or gamma reference point. Each gamma reference point can be used to drive hundreds or thousands of pixel columns (output channels) that are coupled to that column driver device 22.

In practice, PVT (process, voltage, and/or temperature) variations on any given column driver chip 22 can cause channel-to-channel variations. This might be due to varying offset voltages associated with each of the column driver amplifiers 34 within one column driver device 22. In the example of FIG. 2, display 14 may include multiple column driver IC chips 22 each driving a respective group of pixel columns. A display panel 24 may be driven using at least two separate column driver devices 22, two to five column driver devices 22, five to ten column driver devices 22, or more than ten column driver devices 22. The various column driver devices 22 can be formed as separate integrated circuit (IC) chips, each of which can include hundreds or thousands of column drivers 34. PVT variations from one chip 22 to another can further result in chip-to-chip variations. This might also be due to varying offset voltages associated with gamma amplifiers 30 on different column driver devices 22. The channel-to-channel and chip-to-chip variations can result in undesired visual artifacts that might be noticeable to a user of display 14. Auto-zeroing techniques and chopping techniques can be used to help mitigate such variations.

Conventional auto-zero techniques can be employed that involve using a single amplifier to sample the amplifier offset during a sampling phase and then adding the sampled offset in reverse polarity during a subsequent buffering phase. To avoid the potential impact of leakage currents during a display frame, the sampled offset must be refreshed periodically, often at line rate (i.e., within one row time). In high resolution and fast refresh rate displays (e.g., display having refresh rates of at least 60 Hz, at least 90 Hz, or at least 120 Hz), a row or line time is relatively short in duration such that the sampling phase and the buffering phase cannot be completed within the same row time.

Figure 3A:
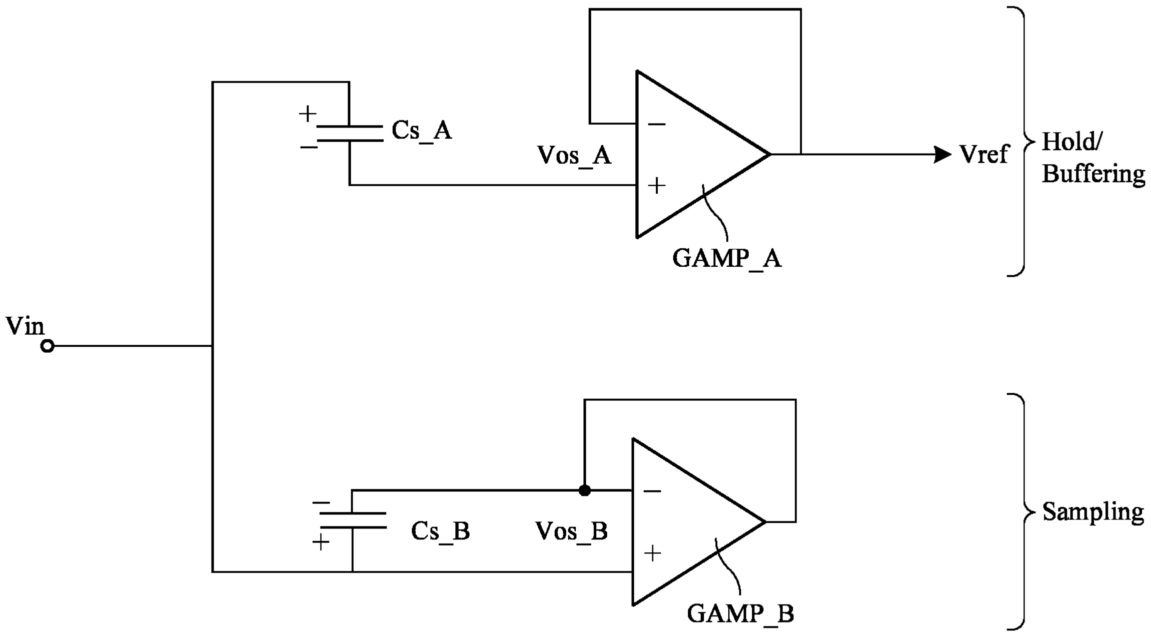
FIGS. 3A and 3B are diagrams showing exemplary offset-sampling and reference-buffering functions alternating between two gamma amplifiers operable to drive a single gamma tap point in an auto-zeroing scheme in accordance with some embodiments.
Figure 3B:
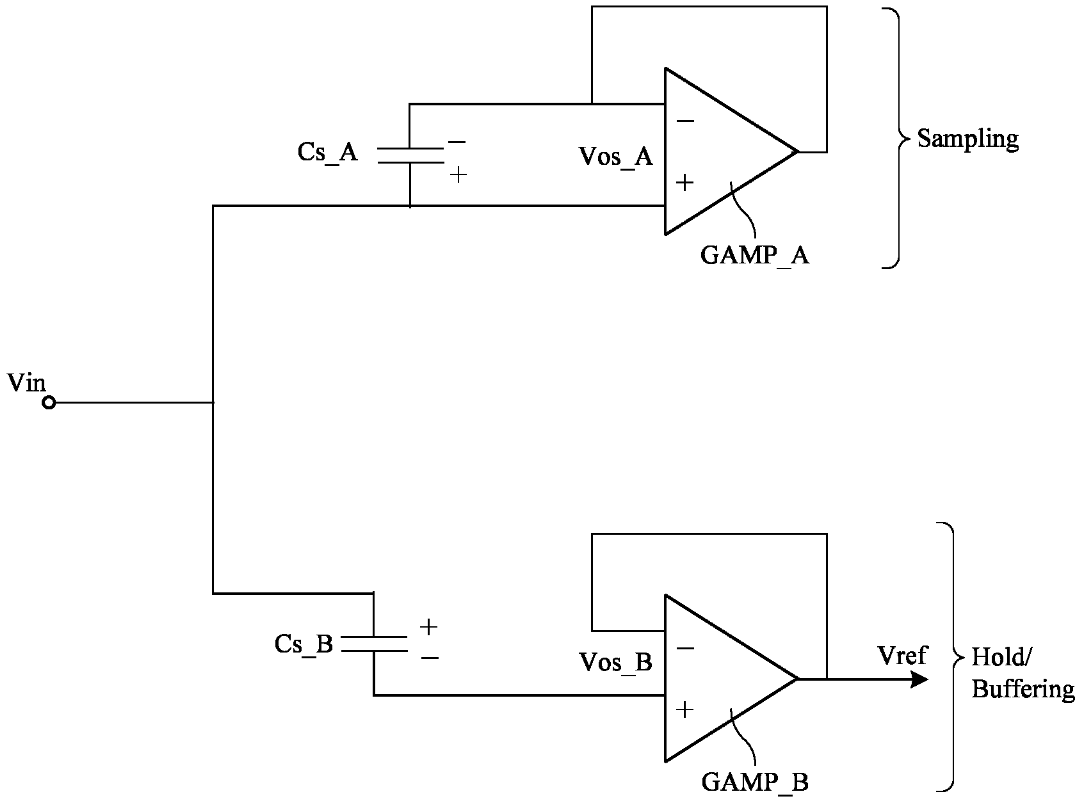

FIGS. 3A and 3B illustrate the concept of the auto-zeroing (AZ) operation in accordance with an embodiment. To overcome the limitation of the shorter line time, each gamma reference point can be driven using a pair of gamma amplifiers GAMP_A and GAMP_B. Gamma amplifiers GAMP_A and GAMP_B are unity gain amplifiers where the output is fed back to its negative input. Both gamma amplifiers GAMP_A and GAMP_B may be coupled to the same input voltage Vin and is driving the same gamma reference voltage Vref.

FIG. 3A shows a first period during which the first gamma amplifier GAMP_A is in the offset-hold (reference buffering) phase to set the gamma reference voltage Vref for the gamma network while the second gamma amplifier GAMP_B is sampling its own offset voltage Vos_B (e.g., amplifier GAMP_B is sampling Vos_B across sampling capacitor Cs_B at its input during the offset-sampling phase). Having a second redundant amplifier therefore allows the reference-buffering and offset-sampling functions to occur simultaneously but using different gamma amplifiers.

FIG. 3B shows a second period during which the second gamma amplifier GAMP_B is in the offset-hold (reference buffering) phase to set the gamma reference voltage Vref for the gamma network while the first gamma amplifier GAMP_A is sampling its own offset voltage Vos_A (e.g., amplifier GAMP_A is sampling Vos_A across sampling capacitor Cs_A at its input during the offset-sampling phase). In other words, the offset-hold and offset-sampling functions can alternate between the two amplifiers GAMP_A and GAMP_B from one phase to another. Note that in FIG. 3A, offset voltage Vos_B is sampled across capacitor Cs_B at the input of amplifier GAMP_B, but in FIG. 3B, the voltage across Cs_B is provided in the opposite polarity to effectively cancel out Vos_B at the input of amplifier GAMP_B.

Figure 4A:
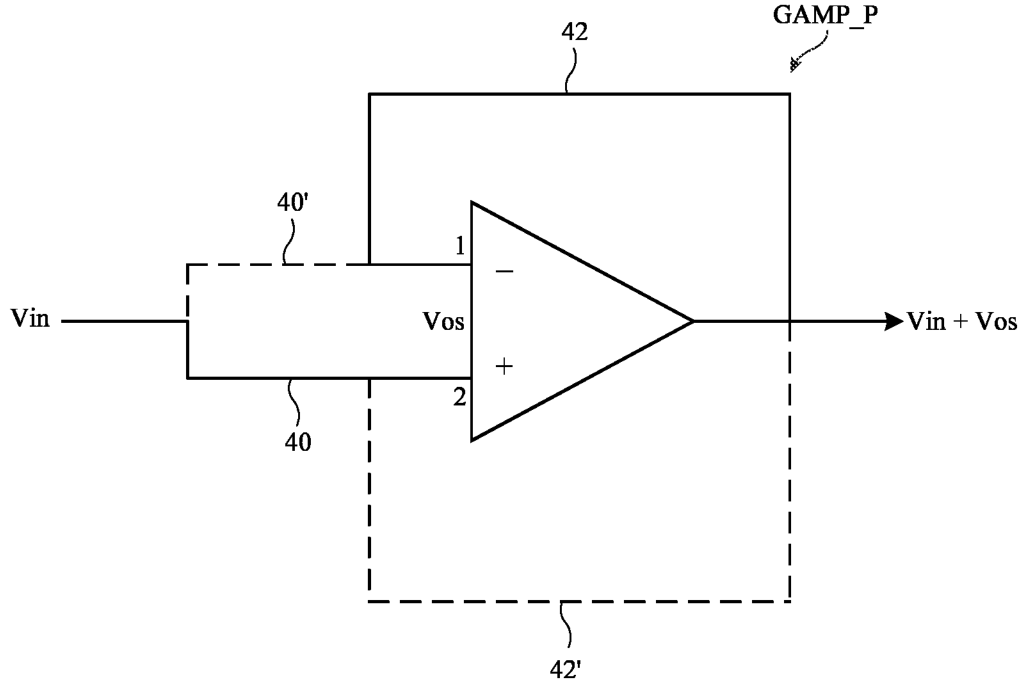
FIGS. 4A and 4B are diagrams showing an illustrative gamma amplifier operating in opposite chopping polarities in accordance with some embodiments.
Figure 4B:
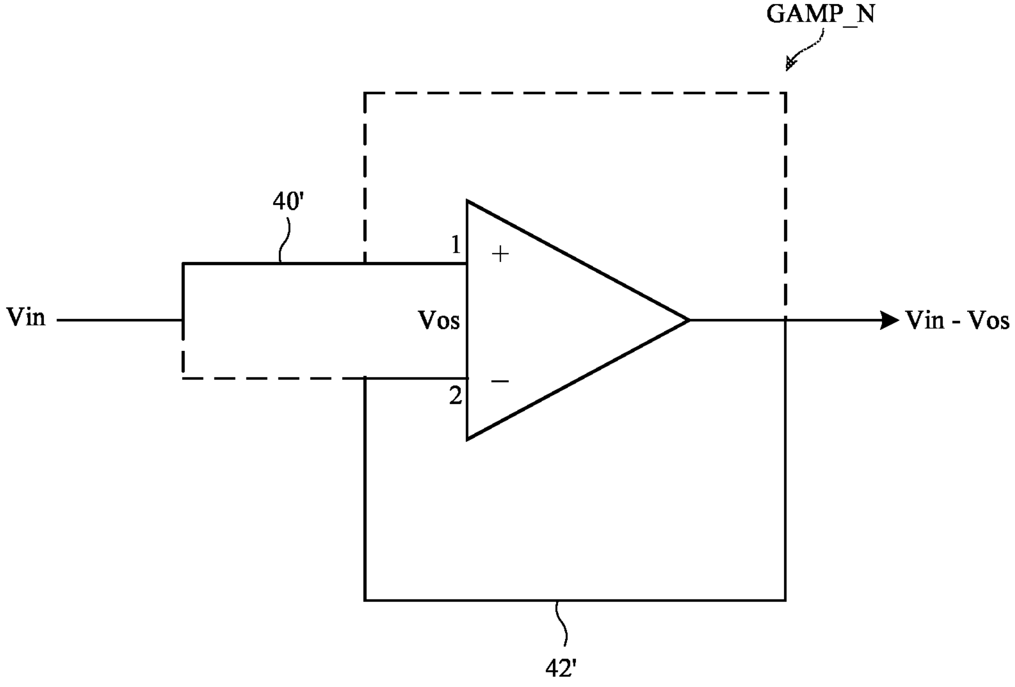

FIGS. 4A and 4B illustrate the concept of the chopping operation in accordance with an embodiment. Chopping involves buffering an input signal when the amplifier is in a first polarity, subsequently buffering the input signal when the amplifier is in a second (opposite) polarity, and then taking a temporal and/or spatial average of the two buffered signals at the output of the amplifier to cancel out the effective amplifier offset voltage.

FIG. 4A illustrates a gamma amplifier configured in a first polarity (see positive amplifier polarity notation GAMP_P). As shown in FIG. 4A, the gamma amplifier may connect the output to its first (1) input via unity gain feedback path 42 and route the input voltage signal Vin to its second (2) input via path 40. Alternate input path 40' and alternate feedback path 42' are deactivated while the gamma amplifier has the first polarity. Configured in this way, gamma amplifier GAMP_P having the first (positive) will generate a sum of the input voltage and the amplifier offset voltage (Vin+Vos) at its output.

FIG. 4B illustrates a gamma amplifier configured in a second polarity opposite to the first polarity (see negative amplifier polarity notation GAMP_N). As shown in FIG. 4B, the gamma amplifier may connect the output to its second (2) input via unity gain feedback path 42" and route the input voltage signal Vin to its first (1) input via path 40'. Alternate input path 40 and alternate feedback path 42 are deactivated while the gamma amplifier has the second polarity. Configured in this way, gamma amplifier GAMP_N having the second (negative) will generate a difference of the input voltage and the amplifier offset voltage (Vin-Vos) at its output. The output of the amplifier obtained from the two polarities can be averaged temporally and/or spatially to eliminate the Vos component. The first and second amplifier polarities are sometimes referred to as positive and negative (amplifier) polarities.

To help mitigate chip-to-chip mismatches, a hybrid auto-zeroing and chopping technique in accordance with some embodiments can be applied to the gamma amplifiers 30, which can reduce or cancel out the effects of the gamma amplifier offset voltage. For the auto-zeroing operation, each gamma reference point (or gamma reference voltage Vref) may be driven by gamma amplifiers GAMP_A and GAMP_B in an alternating fashion. For example, gamma amplifier GAMP_A may be used to drive the odd pixel rows (lines), whereas gamma amplifier GAMP_B may be used to drive the even pixel rows (lines). When driving an odd row, amplifier GAMP_A may provide the buffering (offset-hold) function while amplifier GAMP_B is sampling its own offset in preparation to drive the next even row. When driving an even row, amplifier GAMP_B may provide the buffering (offset-hold) function while amplifier GAMP_A is sampling its own offset in preparation for the next odd row. This type of alternating auto-zeroing operation from one pixel row to another is sometimes referred to as spatial interleaving.

As described above in connection with FIGS. 3A and 3B, the auto-zeroing operation requires the use of two gamma amplifiers GAMP_A and GAMP_B for high resolution and high refresh-rate display panels where the line/row-time is very short. Due to circuit nonidealities, there will be some residual offset even after the Auto-Zero function. To remove such residual offset, the auto-zeroing operation can be combined with the chopping operation. To ensure proper operation for such hybrid (combined) auto-zeroing and chopping scheme, the same amplifier should always be used for every particular row in every frame. For example, if gamma amplifier GAMP_A is used to drive the gamma reference for all of the odd rows in a first frame, then gamma amplifier GAMP_A must also be used to drive the gamma reference for all the odd rows in every other frame as well. As another example, if gamma amplifier GAMP_B is used to drive the gamma reference for rows 3, 4, 7, 8, 11, 12, and so on in a first frame, then gamma amplifier GAMP_B must also be used to drive the gamma reference for rows 3, 4, 7, 8, 11, 12 and so on in every consecutive frame as well.

Moreover, the polarity of the chopping should also be toggled every frame (or every few frames) to ensure that each polarity is utilized the same number of times. As an example of chopping every frame, if amplifier GAMP_A driving a first row has a first polarity in a first frame, then amplifier GAMP_A driving the first row may switch to a second (opposite) polarity in a second frame following the first frame. Amplifier GAMP_A may then switch back to the first polarity when driving the first row during a third frame following the second frame and may alternate again to the second polarity when driving the first row during a fourth frame following the third frame.

As another example of chopping every two frames, if amplifier GAMP_A driving a first row has a first polarity in first and second consecutive frames, then amplifier GAMP_A driving the first row may switch to a second (opposite) polarity in the third and fourth consecutive frames following the second frame. Amplifier GAMP_A may then switch back to the first polarity when driving the first row during fifth and sixth consecutive frames following the fourth frame.

Figure 5:
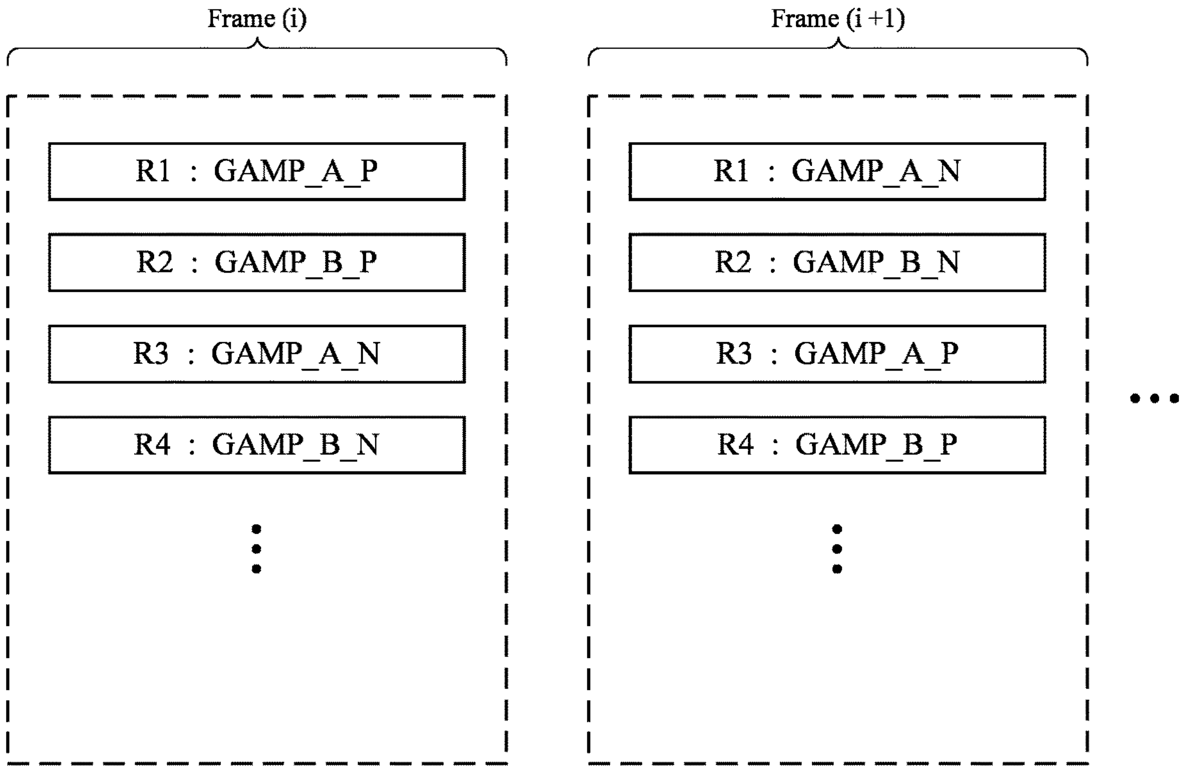
FIG. 5 is a diagram illustrating the operation of a display where the auto-zeroing function alternates (spatially) every row and where the chopping polarity changes (spatially) every two rows and changes (temporally) every frame in accordance with some embodiments.

Thus, when combining the auto-zeroing operation with the chopping operation, the polarities of the gamma amplifiers can be adjusted spatially (e.g., from one row or group of rows to another) and temporally (e.g., from one frame or group of frames to another). FIG. 5 is a diagram illustrating an operation of display 14 where the auto-zeroing alternates (spatially) every row and where the chopping polarity changes spatially every two rows within each frame and changes temporally every frame. As shown in FIG. 5, during a first frame (i), the first gamma amplifier with the first polarity (as indicated by notation GAMP_A_P) is used to drive a gamma reference for a first row of pixels R1; the second gamma amplifier with the first polarity (as indicated by notation GAMP_B_P) is used to drive a gamma reference for a second row of pixels R2; the first gamma amplifier with the second opposite polarity (as indicated by notation GAMP_A_N) is used to drive a gamma reference for a third row of pixels R3; and the second gamma amplifier with the second opposite polarity (as indicated by notation GAMP_B_N) is used to drive a gamma reference for a fourth row of pixels R4. This pattern where the auto-zeroing alternates between GAMP_A and GAMP_B every row and the chopping polarity changes every two rows (e.g., rows R1 and R2 uses the first polarity P, whereas rows R3 and R4 uses the second polarity N) may be replicated for the remaining rows in frame (i).

When transitioning to a second frame (i+1), the gamma amplifier for each row may change its polarity. During the second frame (i+1), the first gamma amplifier with the second polarity (as indicated by notation GAMP_A_N) is used to drive the gamma reference for the first row of pixels R1; the second gamma amplifier with the second polarity (as indicated by notation GAMP_B_N) is used to drive the gamma reference for the second row of pixels R2; the first gamma amplifier with the first polarity (as indicated by notation GAMP_A_P) is used to drive the gamma reference for the third row of pixels R3; and the second gamma amplifier with the first polarity (as indicated by notation GAMP_B_P) is used to drive the gamma reference for the fourth row of pixels R4. This pattern where the autozeroing alternates between GAMP_A and GAMP_B every row and the chopping polarity changes every two frames (e.g., rows R1 and R2 uses the second polarity N, whereas rows R3 and R4 uses the first polarity P) may be replicated for the remaining rows in frame (i+1). The pattern of frames (i) and (i+1) may repeat itself for the subsequent frames (i+2), (i+3), (i+4), (i+5), and so on.

Figure 6:
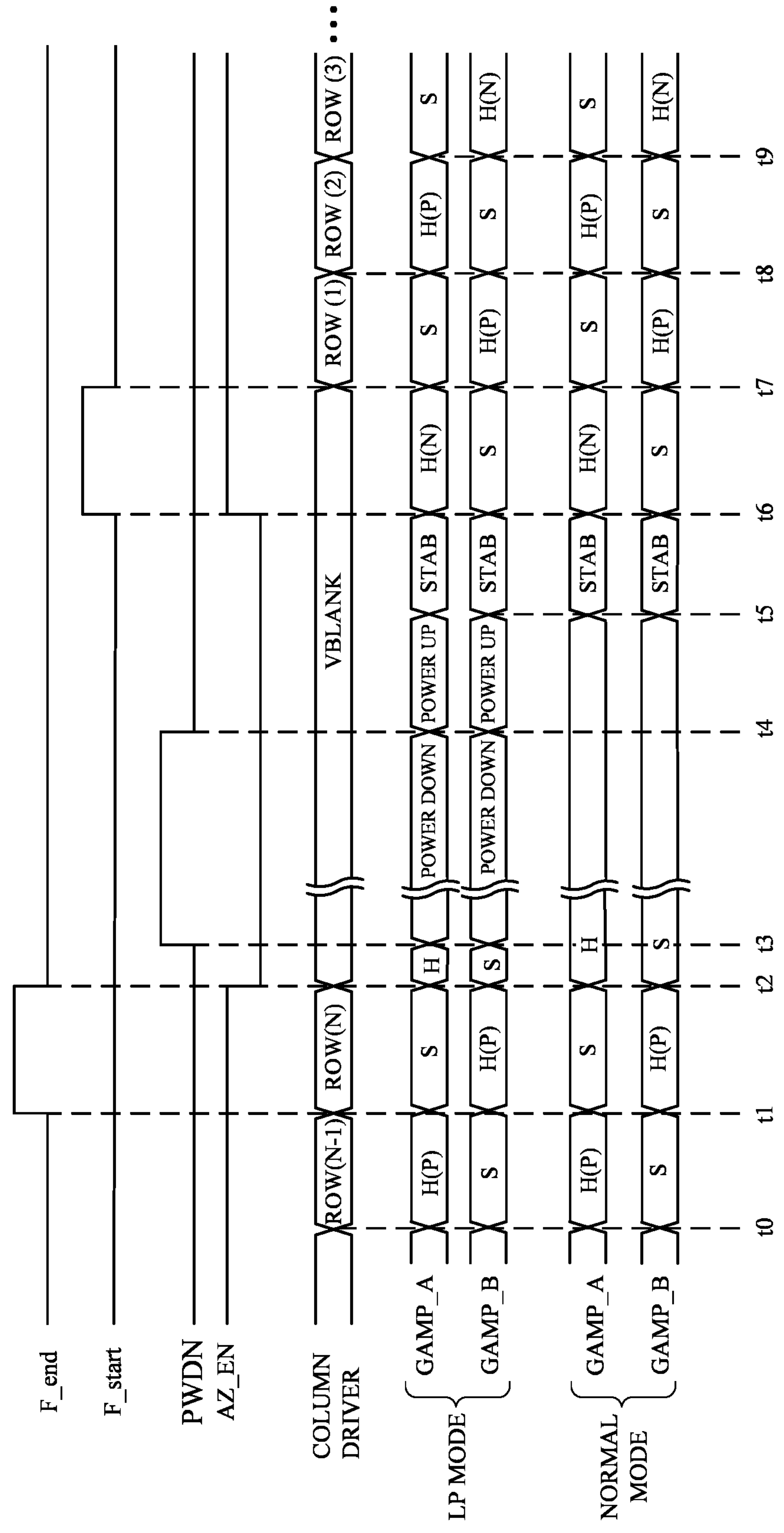
FIG. 6 is a timing diagram illustrating the behavior of relevant waveforms during operation of a display having both spatially and temporally interleaved auto-zeroing and chopping capabilities in accordance with some embodiments.

FIG. 6 is a timing diagram illustrating the behavior of relevant waveforms during operation of display 14 having interleaved auto-zeroing and chopping capabilities. FIG. 6 illustrates the behavior of a pair of auto-zeroing gamma amplifiers GAMP_A and GAMP_B driving the same gamma reference in either a low power (LP) mode or a normal mode. During the low power mode, the gamma amplifiers may be powered down during blanking periods to reduce power consumption. During the normal mode, the gamma amplifiers may remain powered up during the blanking periods.

At time t0, first gamma amplifier GAMP_A in the first polarity (P) may be used in the offset-hold (reference-buffering) phase to drive the penultimate row (N−1). At time t1, second gamma amplifier GAMP_B in the first polarity (P) may be used in the offset-hold (reference-buffering) phase to drive the last row (N) in the array. The notation (H) refers to the offset-hold/reference-buffering phase of the AZ operation, whereas the notation(S) refers to the offset-sampling phase of the AZ operation.

An end of frame signal F_end may be pulsed high at time t1 to alert the system that the end of current frame is imminent. End of frame signal F_end may cause gamma amplifiers GAMP_A and GAMP_B to be parked in a fixed known state during vertical blanking period VBLANK. End of frame signal F_end may also disable the auto-zeroing operation, as indicated by the deassertion of the auto-zeroing enable signal AZ_EN at time t2. When signal AZ_EN is asserted (e.g., driven high), the auto-zeroing function may be enabled. The auto-zero and chopping operations are not impacted by the number of rows N.

At time t3, a power down signal PWDN may be pulsed high after entering the vertical blanking period. If the low power mode is enabled, the asserted PWDN signal will cause both gamma amplifiers GAMP_A and GAMP_B to be powered off to shut down part of or the entire gamma network. The power down operation does not care about the state of the auto-zeroing phases prior to shut down.

If the low power mode is not enabled, signal PWDN may have no effect on the gamma amplifiers (e.g., amplifiers GAMP_A and GAMP_B may continue its current hold or sampling state. During blanking time VBLANK, any high impedance nodes associated with the gamma amplifiers should also be avoided. For instance, the hold/buffering gamma amplifier should be kept in a non-auto-zero drive mode to avoid saturation of the gamma network due to leakage current accumulating in the auto-zero sampling capacitor (e.g., the sampling capacitor for the buffering amplifier may be bypassed during the normal mode).

At time t4, signal PWDN may be deasserted (e.g., driven low), which causes the gamma amplifiers to be powered up when low-power mode is enabled. After the gamma amplifiers have been powered up (at time t5), the gamma amplifiers may undergo stabilization. The gamma amplifiers should not be switched in any way (e.g., switching between H and S phases or switching polarities) during the stabilization period. Some dummy packets may be transmitted over a serial link from timing controller 20 to a column driver device 22. The number of dummy packets conveyed to column driver device 22 during this time shall not affect current AZ phase or chopping polarity of the gamma amplifiers.

At time t6, a start of frame signal F_start may be pulsed high through a link protocol to alert column driver device 22 that the start of the next frame is imminent. Start of frame signal F_start may reenable the auto-zero operation, as indicated by the assertion of auto-zeroing enable signal AZ_EN. The start of frame signal F_start may reset the AZ phase (e.g., the starting auto-zeroing phase of GAMP_A and GAMP_B has no dependency on the duration of blank time VBLANK). If desired, start of frame signal F_start may set the chopping polarity based on the desired chopping frequency (e.g., whether to switch chopping polarities every frame or every few frames). During this time, one of the two gamma amplifiers for each gamma reference tap (GAMP_B in the illustrative case of FIG. 6) will sample its offset across a storage cap.

At time t7, the second gamma amplifier GAMP_B (which was previously in the sample phase) configured in the first chopping polarity (P) may be used in the hold/buffering phase to drive the first row (1). At time t8, first gamma amplifier GAMP_A in the first chopping polarity (P) may be used in the hold/buffering phase to drive the second row (2) in the array. At time t9, second gamma amplifier GAMP_B in the second chopping polarity (N) may be used in the hold/buffering phase to drive the third row (3). The auto-zeroing phases H and S may continue alternating every row for both amplifiers GAMP_A and GAMP_B and the chopping polarity may continue to switch every two rows.

Figure 7A:
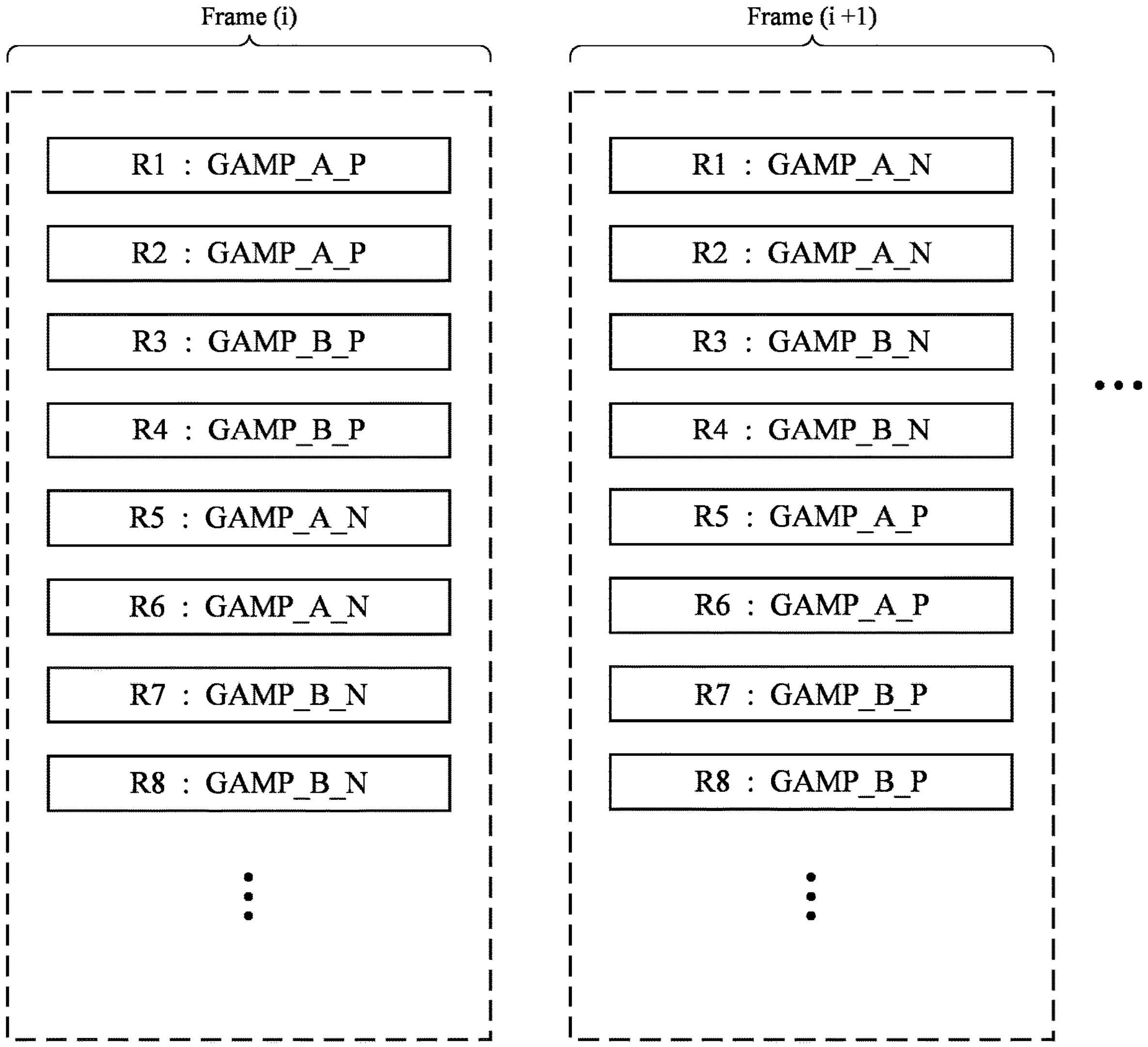
FIG. 7A is a diagram illustrating the operation of a display where the auto-zeroing function changes (spatially) every two rows and where the chopping polarity changes (spatially) every four rows and changes (temporally) every frame in accordance with some embodiments.

FIG. 7A is a diagram illustrating the operation of display 14 where the auto-zeroing function changes (spatially) between GAMP_A and GAMP_B every two rows and where the chopping polarity changes (spatially) every four rows and changes (temporally) every frame. As shown in FIG. 7A, during a first frame (i), the first gamma amplifier with the first polarity (as indicated by notation GAMP_A_P) is used to drive a gamma reference for a first row of pixels R1; GAMP_A_P is also used to drive a gamma reference for a second row of pixels R2; the second gamma amplifier with the first polarity (as indicated by notation GAMP_B_P) is used to drive a gamma reference for a third row of pixels R3; GAMP_B_P is also used to drive a gamma reference for a fourth row of pixels R4; the first gamma amplifier with the second opposite polarity (as indicated by notation GAMP_A_N) is used to drive a gamma reference for a fifth row of pixels R5; GAMP_A_N is also used to drive a gamma reference for a sixth row of pixels R6; the second gamma amplifier with the second opposite polarity (as indicated by notation GAMP_B_N) is used to drive a gamma reference for a seventh row of pixels R7; GAMP_B_N is also used to drive a gamma reference for an eight row of pixels R8; and so on. This pattern where the auto-zeroing changes between GAMP_A and GAMP_B every two rows and the chopping polarity changes every four rows (e.g., rows R1-R4 uses the first polarity P, whereas rows R5-R8 uses the second polarity N) may be replicated for the remaining rows in frame (i).

When transitioning to a second frame (i+1), the gamma amplifiers for each row may change its polarity. During the second frame (i+1), GAMP_A_N is used to drive the gamma reference for pixel row R1; GAMP_A_N is also used to drive the gamma reference for pixel row R2; GAMP_B_N is used to drive the gamma reference for pixel row R3; GAMP_B_N is also used to drive the gamma reference for pixel row R4; GAMP_A_P is used to drive the gamma reference for pixel row R5; GAMP_A_P is also used to drive the gamma reference for pixel row R6; GAMP_B_P is used to drive the gamma reference for pixel row R7; GAMP_B_P is also used to drive the gamma reference for pixel row R8; and so on. This pattern where the auto-zeroing switches from GAMP_A to GAMP_B (or vice versa) every two rows and the chopping polarity changes every four rows (e.g., rows R1-R4 uses the first polarity P, whereas rows R5-R8 uses the second polarity N) may be replicated for the remaining rows in frame (i+1). The pattern of frames (i) and (i+1) described above may repeat itself for the subsequent frames (i+2), (i+3), (i+4), (i+5), and so on.

Figure 7B:
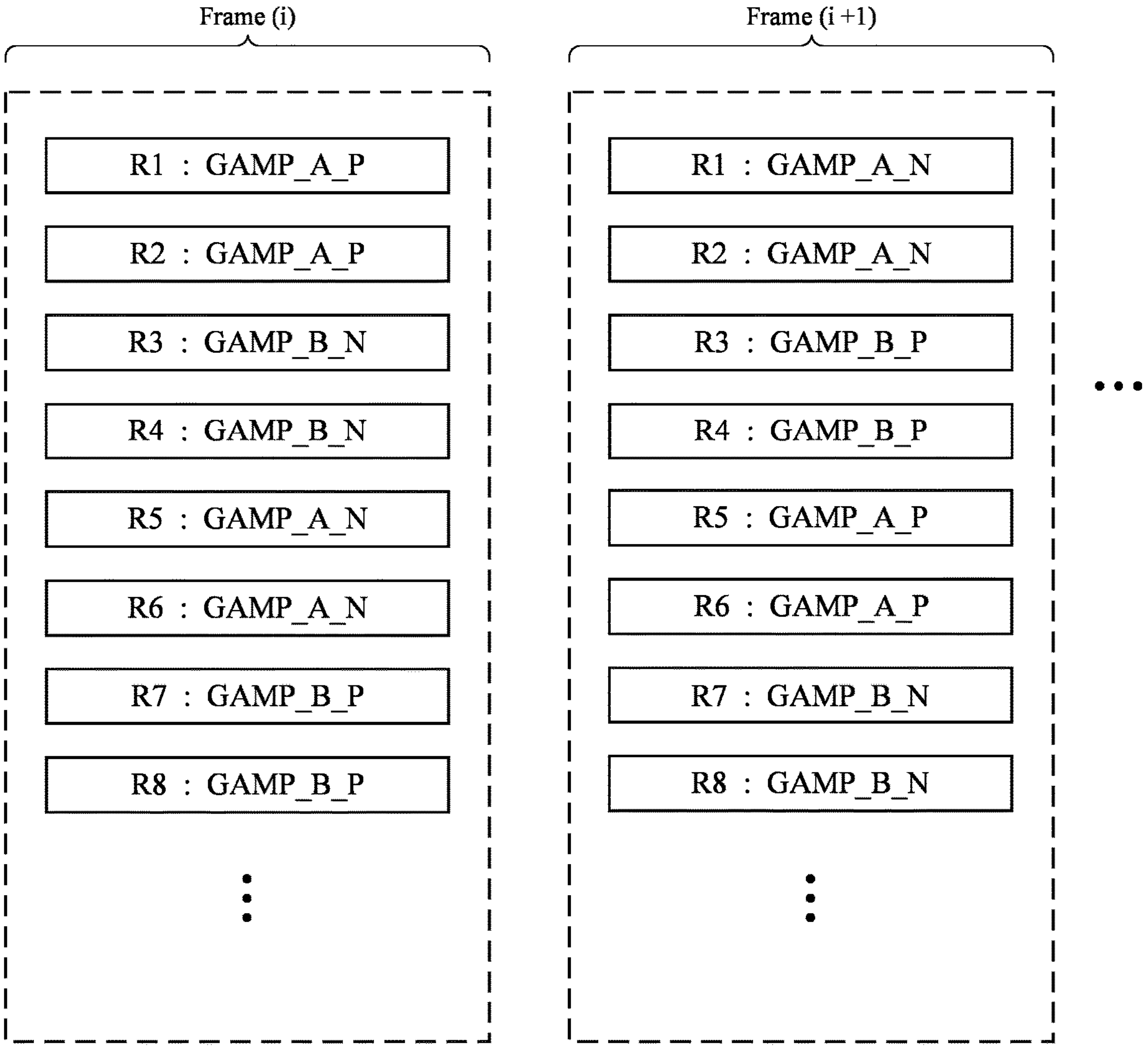
FIG. 7B is a diagram illustrating the operation of a display where the auto-zeroing function changes (spatially) every two rows and where the chopping polarity changes (spatially) every two rows and changes (temporally) every frame in accordance with some embodiments.

FIG. 7B is a diagram illustrating the operation of display 14 where the auto-zeroing function changes (spatially) between GAMP_A and GAMP_B every two rows and where the chopping polarity changes (spatially) every two rows and changes (temporally) every frame. As shown in FIG. 7B, during a first frame (i), the first gamma amplifier with the first polarity (as indicated by notation GAMP_A_P) is used to drive a gamma reference for a first row of pixels R1; GAMP_A_P is also used to drive a gamma reference for a second row of pixels R2; the second gamma amplifier with the second polarity (as indicated by notation GAMP_B_N) is used to drive a gamma reference for a third row of pixels R3; GAMP_B_N is also used to drive a gamma reference for a fourth row of pixels R4; the first gamma amplifier with the second opposite polarity (as indicated by notation GAMP_A_N) is used to drive a gamma reference for a fifth row of pixels R5; GAMP_A_N is also used to drive a gamma reference for a sixth row of pixels R6; the second gamma amplifier with the first opposite polarity (as indicated by notation GAMP_B_P) is used to drive a gamma reference for a seventh row of pixels R7; GAMP_B_P is also used to drive a gamma reference for an eight row of pixels R8; and so on. This pattern where the auto-zeroing changes between GAMP_A and GAMP_B every two rows and the chopping polarity changes every two rows (e.g., rows R1-R2 uses the first polarity P, whereas rows R3-R4 uses the second polarity N) may be replicated for the remaining rows in frame (i).

When transitioning to a second frame (i+1), the gamma amplifiers for each row may change its polarity. During the second frame (i+1), GAMP_A_N is used to drive the gamma reference for pixel row R1; GAMP_A_N is also used to drive the gamma reference for pixel row R2; GAMP_B_P is used to drive the gamma reference for pixel row R3; GAMP_B_P is also used to drive the gamma reference for pixel row R4; GAMP_A_P is used to drive the gamma reference for pixel row R5; GAMP_A_P is also used to drive the gamma reference for pixel row R6; GAMP_B_N is used to drive the gamma reference for pixel row R7; GAMP_B_N is also used to drive the gamma reference for pixel row R8; and so on. This pattern where the auto-zeroing switches from GAMP_A to GAMP_B (or vice versa) every two rows and the chopping polarity changes every two rows (e.g., rows R1-R2 uses the first polarity P, whereas rows R3-R4 uses the second polarity N) may be replicated for the remaining rows in frame (i+1). The pattern of frames (i) and (i+1) described above may repeat itself for the subsequent frames (i+2), (i+3), (i+4), (i+5), and so on.

Figure 8:
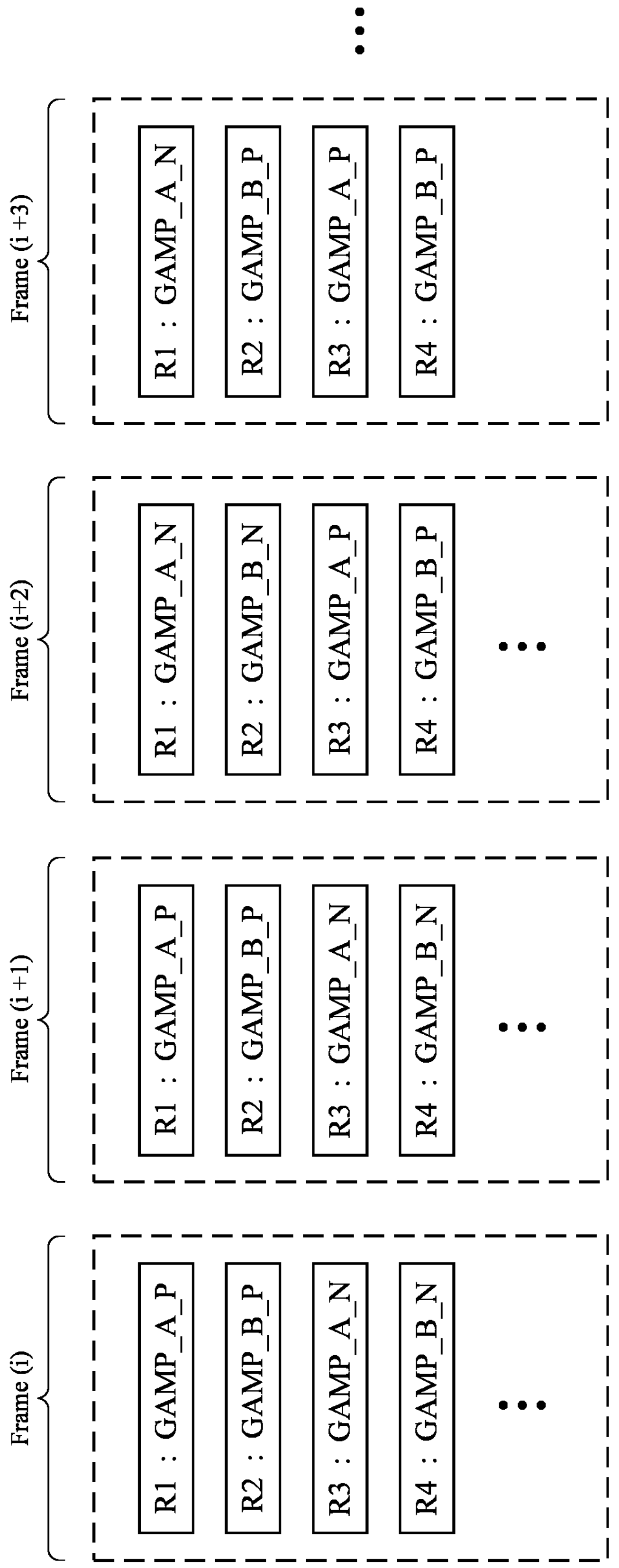
FIG. 8 is a diagram illustrating the operation of a display where the auto-zeroing function changes (spatially) every row and where the chopping polarity changes (spatially) every two rows and changes (temporally) every two frames in accordance with some embodiments.

FIG. 8 illustrates another example of display 14 where the auto-zeroing function changes (spatially) every row and where the chopping polarity changes (spatially) every two rows and changes (temporally) every two frames. During the first frame (i), GAMP_A_P is used to drive the gamma reference for pixel row R1; GAMP_B_P is used to drive the gamma reference for pixel row R2; GAMP_A_N is used to drive the gamma reference for pixel row R3; GAMP_B_N is used to drive the gamma reference for pixel row R4; and so on. This pattern where the auto-zeroing changes between GAMP_A and GAMP_B every row and the chopping polarity changes every two rows (e.g., rows R1-R2 uses the first polarity P, whereas rows R3-R4 uses the second polarity N) may be replicated for the remaining rows in frame (i). In an alternate scenario, GAMP_B_N may be used for row R2, whereas GAMP_B_P is used for row R4 during frame (i). Regardless, the polarity for each gamma amplifier will change every two rows (GAMP_A will change its polarity for rows R1, R3, R5, and so on, whereas GAMP_B will change its polarity for rows R2, R4, R6, and so on).

When transitioning to a second frame (i+1), the gamma amplifiers for each row may retain its polarity. Thus, the AZ and chopping scheme for the second frame may be identical to frame (i) and need not be reiterated in detail.

When transitioning to a third frame (i+2), the gamma amplifiers for each row may change its polarity. During the third frame (i+2), GAMP_A_N is used to drive the gamma reference for pixel row R1; GAMP_B_N is used to drive the gamma reference for pixel row R2; GAMP_A_P is used to drive the gamma reference for pixel row R3; GAMP_B_P is used to drive the gamma reference for pixel row R4; and so on. This pattern where the auto-zeroing changes between GAMP_A and GAMP_B every row and the chopping polarity changes every two rows (e.g., rows R1-R2 uses the second polarity N, whereas rows R3-R4 uses the first polarity P) may be replicated for the remaining rows in frame (i+2). In the alternate scenario mentioned above, GAMP_B_P will instead be used for row R2, whereas GAMP_B_N will instead be used for row R4 during frame (i+2). Regardless, the polarity for each gamma amplifier should change every two rows (GAMP_A will change its polarity for rows R1, R3, R5, and so on, whereas GAMP_B will change its polarity for rows R2, R4, R6, and so on).

When transitioning to a fourth frame (i+3), the gamma amplifiers for each row may retain its polarity. Thus, the AZ and chopping scheme for the fourth frame may be identical to frame (i+2) and need not be reiterated in detail. The pattern of frames (i) through (i+3) described above may repeat itself for the subsequent frames (i+4), (i+5), (i+6), (i+7), and so on.

The exemplary auto-zeroing and chopping spatial and temporal interleaving schemes shown in FIGS. 5, 7, and 8 are merely illustrative and are not intended to limit the scope of the present embodiments. In general, the auto-zeroing may switch/alternate spatially between amplifiers GAMP_A and GAMP_B every row (e.g., GAMP_A is used to drive R1 while GAMP_B is used to drive R2, and so on), every two rows (e.g., GAMP_A is used to drive R1-R2 while GAMP_B is used to drive R3-R4, and so on), every three rows (e.g., GAMP_A is used to drive R1-R3 while GAMP_B is used to drive R4-R6, and so on), every four rows, every five rows, etc.

If desired, the chopping polarity may switch or alternate spatially every row (e.g., the positive polarity is used for R1 while the negative polarity is used for R2), every two rows (e.g., the positive polarity is used for rows R1-R2 while the negative polarity is used for rows R3-R4), every three rows (e.g., the positive polarity is used for rows R1-R3 while the negative polarity is used for rows R4-R6), every four rows, every five to ten rows, or generally every group of rows (where each group can include two adjacent rows, three adjacent rows, four adjacent rows, etc.).

If desired, the chopping polarity may switch or alternate temporally every frame (e.g., the positive polarity is used for a given row during a first frame while the negative polarity is used for the given row during a second frame and so on), every two frames (e.g., the positive polarity is used for a given row during first and second frames while the negative polarity is used for the given row during third and fourth frames and so on), every three frames (e.g., the positive polarity is used for a given row during the first, second, and third frames while the negative polarity is used for the given row during fourth, fifth, and sixth frames and so on), every four frames, every five to ten frames, or generally every group of frames (where each group of frames can include two consecutive frames, three consecutive frames, four consecutive frames, etc.).

The foregoing is merely illustrative and various modifications can be made by those skilled in the art without departing from the scope and spirit of the described embodiments. The foregoing embodiments may be implemented individually or in any combination.

What is claimed is:

1. A display comprising:

an array of pixels arranged in rows and columns;

a plurality of column driver circuits configured to generate data signals for corresponding columns of pixels in the array; and first and second gamma amplifiers configured to set a gamma reference that is used to drive the data signals at the plurality of column driver circuits, wherein the first gamma amplifier is configured to operate in an offset-hold phase while the second gamma amplifier operates in an offset-sampling phase and is configured to operate in the offset-sampling phase while the second gamma amplifier operates in the offset-hold phase, the first gamma amplifier is used to set the gamma reference for driving data signals to a first row of pixels in the array during first and second consecutive frames while operating in the offset-hold phase, the second gamma amplifier is used to set the gamma reference for driving data signals to a second row of pixels in the array during the first and second consecutive frames while operating in the offset-hold phase, and the first gamma amplifier, during the first frame, has a first polarity when setting the gamma reference for driving data signals to the first row of pixels in the array and has a second polarity opposite the first polarity when setting the gamma reference for driving data signals to a third row of pixels in the array.

2. The display of claim 1, wherein the second gamma amplifier has the first polarity when setting the gamma reference for driving data signals to the second row of pixels in the array and has the second polarity when setting the gamma reference for driving data signals to a fourth row of pixels in the array.

3. The display of claim 1, wherein the first gamma amplifier has the second polarity when setting the gamma reference for driving data signals to the first row of pixels during the second frame.

4. The display of claim 1, wherein the second gamma amplifier, during the first frame, has the first polarity when setting the gamma reference for driving data signals to the second row of pixels and has the second polarity when setting the gamma reference for driving data signals to a fourth row of pixels in the array.

5. The display of claim 4, wherein the second gamma amplifier has the second polarity when setting the gamma reference for driving data signals to the second row of pixels during the second frame.

6. The display of claim 5, wherein the first gamma amplifier has the second polarity when setting the gamma reference for driving data signals to the third row of pixels during the first frame and has the first polarity when setting the gamma reference for driving data signals to the third row of pixels during the second frame.

7. The display of claim 6, wherein the second gamma amplifier has the second polarity when setting the gamma reference for driving data signals to the fourth row of pixels during the first frame and has the first polarity when setting the gamma reference for driving data signals to the fourth row of pixels during the second frame.

8. The display of claim 1, wherein the first gamma amplifier has the first polarity when setting the gamma reference for driving data signals to the first row of pixels during the second frame.

9. The display of claim 8, wherein the second gamma amplifier has the first polarity when setting the gamma reference for driving data signals to the second row of pixels during the first and second frames.

10. The display of claim 9, wherein the first gamma amplifier has the second polarity when setting the gamma reference for driving data signals to the first row of pixels during third and fourth consecutive frames following the second frame.

11. The display of claim 10, wherein the second gamma amplifier has the second polarity when setting the gamma reference for driving data signals to the second row of pixels during the third and fourth frames.

12. The display of claim 1, wherein the first gamma amplifier has the first polarity when setting the gamma reference for driving data signals to a first additional row of pixels adjacent to the first row of pixels during the first frame.

13. The display of claim 12, wherein the second gamma amplifier has the first polarity when setting the gamma reference for driving data signals to a second additional row of pixels adjacent to the third row of pixels during the first frame.

14. The display of claim 13, wherein the first gamma amplifier has the second polarity when setting the gamma reference for driving data signals to a third additional row of pixels adjacent to the third row of pixels during the first frame.

15. A method of operating display circuitry, comprising:

using first and second gamma amplifiers to set a gamma reference for driving data signals to an array of pixels;

using the first gamma amplifier to set the gamma reference for driving data signals to a first row of pixels in the array during first and second frames, the first gamma amplifier having a first chopping polarity during the first frame and having a second chopping polarity opposite of the first chopping polarity during the second frame; and using the second gamma amplifier to set the gamma reference for driving data signals to a second row of pixels in the array during the first and second frames, the second gamma amplifier having the first chopping polarity during the first frame and having the second chopping polarity during the second frame.

16. The method of claim 15, further comprising:

using the first gamma amplifier having the second chopping polarity to set the gamma reference for driving data signals to a third row of pixels in the array during the first frame; and using the second gamma amplifier having the second chopping polarity to set the gamma reference for driving data signals to a fourth row of pixels in the array during the first frame.

17. The method of claim 15, further comprising:

using the first gamma amplifier having the first chopping polarity to set the gamma reference for driving data signals to the first row of pixels during an additional frame following the first frame and preceding the second frame; and using the second gamma amplifier having the first chopping polarity to set the gamma reference for driving data signals to the second row of pixels during an additional frame following the first frame and preceding the second frame.

18. The method of claim 15, further comprising:

during the first frame, using the first gamma amplifier having the first chopping polarity to set the gamma reference for driving data signals to a first additional row of pixels adjacent to the first row of pixels; and during the first frame, using the second gamma amplifier having the first chopping polarity to set the gamma reference for driving data signals to a second additional row of pixels adjacent to the second row of pixels.

19. A display comprising:

an array of pixels formed on a substrate; and a plurality of column driver integrated circuits, each having at least first and second gamma amplifiers configured to set a gamma reference that is used to drive data signals to the array of pixels, wherein the first gamma amplifier is used to set the gamma reference for driving data signals to a first row of pixels in the array across multiple frames, the second gamma amplifier is used to set the gamma reference for driving data signals to a second row of pixels in the array across multiple frames, and the first and second gamma amplifiers have a chopping polarity that alternates every frame or every group of consecutive frames.

20. The display of claim 19, wherein the chopping polarity of the first and second gamma amplifiers changes every two rows or every four rows during a given frame.

* * * * *